UNITED STATES PATENT OFFICE.

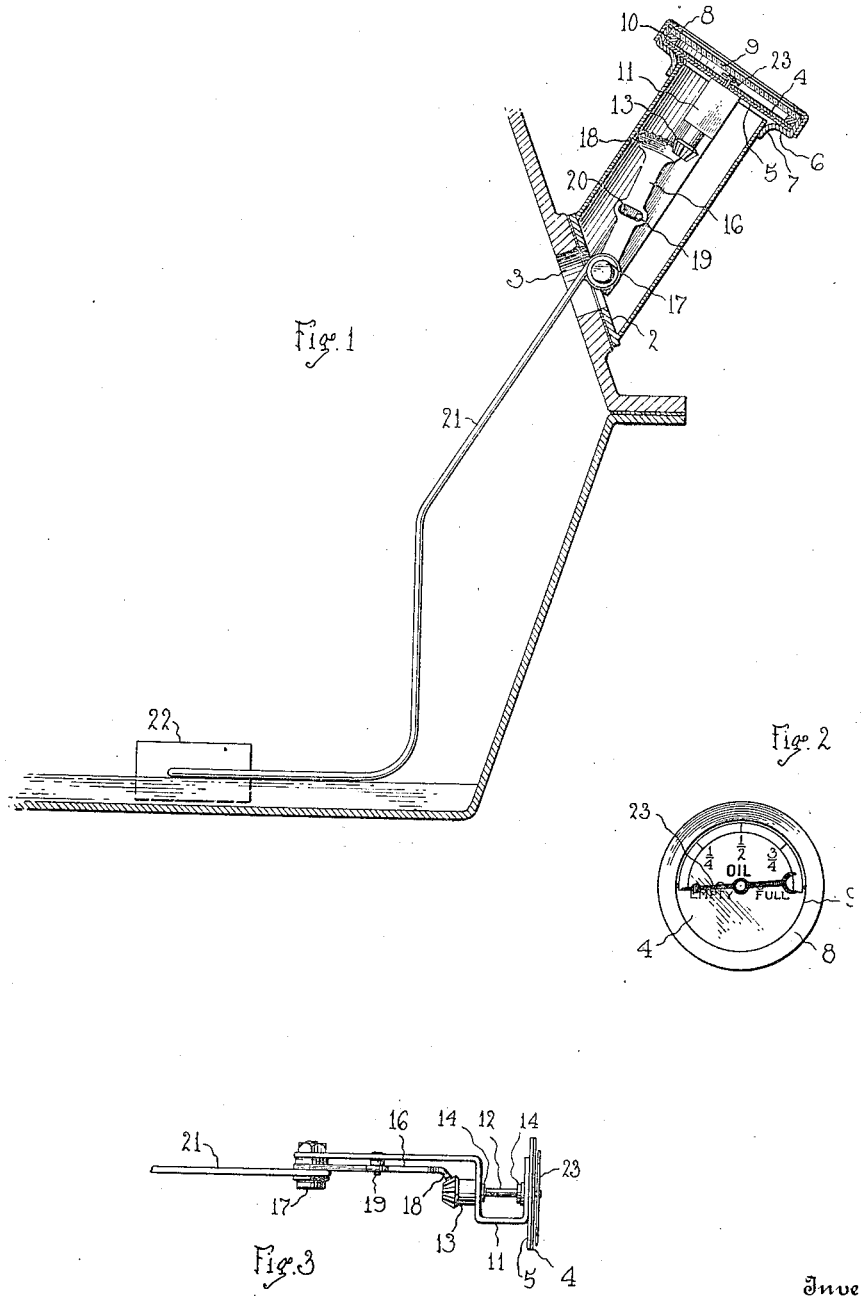

PHILO M. GELATT, OF LA CROSSE, WISCONSIN.

TANK-GAGE.

1,252,683.  Specification of Letters Patent.  Patented Jan. 8, 1918.

Application filed July 16, 1917. Serial No. 180,711.

*To all whom it may concern:*

Be it known that I, PHILO M. GELATT, a citizen of the United States of America, residing at La Crosse, in the county of La Crosse and State of Wisconsin, have invented certain new and useful Improvements in Tank-Gages, of which the following is a specification, reference being had therein to the accompanying drawings.
In the operation of explosive engines it is desirable to show whether the oil reservoir of the engine, particularly if the latter be of the splash system of lubrication type, has a working supply of oil.
This invention relates to a gage for the oil systems of internal combustion motors and to an arrangement thereof which is extremely simple, readily arranged for any motor and extremely accurate in its action.
The invention consists in the matters hereinafter set forth, and more particularly pointed out in the appended claims.

In the drawings,

Figure 1 is a view in section of an engine casing together with an applied gage that embodies features of the invention;

Fig. 2 is a plan view of the dial of the gage;

Fig. 3 is a view in detail of the gage operating mechanism.

As herein shown, a cylindrical gage casing 1, of any suitable material and preferably with a base flange 2, is arranged to be secured over an opening 3 in an engine casing adjacent the oil sump or reservoir. A dial plate 4 and cover plate 5 are superposed on the inner flange 6 of a head 7 formed on or secured to the casing and are clamped there by an exterior collar 8, the internal flange of which holds a glass 9 and gasket 10 down upon the dial.

A support 11, preferably in the form of a metal strip having a double offset portion at the upper end, is secured against the underside of the plates so as to depend into the casing. A spindle, journaled in the offset portion of the member 11 extends through the dial plate with a suitable index 23 thereon traversing the dial, and carries at its lower end a beveled pinion 12. Suitable stops 14, preferably in the form of split washers, prevent the endwise movement of the spindle. A segmental gear 16 preferably formed or struck out of sheet metal is pivoted on a pin 17 at the lower end of the member 11 with its flanges and toothed upper end portion 18 in mesh with the pinion 13. A stop 19 on the support 11 engages a segmental slot 20 in the gear and limits the oscillation of the latter. A depending and preferably bendable rod 21 secured to the lower end portion or hub of the gear 16 carries a float 22, the bendable rod permitting adjustment of the float so that it will cause the dial mechanism to properly register the level of the contents of the lubricant container in the motor in which the device is applied.

As a result of this construction, a very efficient, simple and readily adjustable gage or indicator is obtained which is readily mounted in place and calibrated to the particular motor to which it is connected.

Obviously, changes in the details of construction may be made without departing from the spirit of my invention and I do not care to limit myself to any particular form or arrangement of parts.

What I claim is:—

1. A gage comprising a casing having a dial plate, an index therefor and a cover at one end, a support in the casing secured to the plate and cover, a spindle journaled in the upper portion of the support to operate the index, a beveled pinion on the spindle, a segmental gear pivoted to the lower portion of the support to oscillate in mesh with the pinion, a stop on the support engaging a slot in the gear and limiting the movement of the gear in either direction, and a float connected by a rod to the gear to oscillate the latter.

2. A gage comprising a casing, a dial plate and cover plate detachably secured over one end thereof, an index for the dial plate, a support in the casing, a spindle journaled in the support to operate the index, a beveled pinion on the spindle below the plate, a segmental gear pivoted to the lower portion of the support in mesh with the pinion, a stop pin on the support engaging a segmental slot in the gear to limit the motion thereof, and a float connected by a rod to the gear to oscillate the latter.

3. A gage comprising a casing, a dial plate, an index therefor, a cover detachably securing the dial plate in the casing, a support extending downwardly from the plate, a spindle journaled in the upper portion of the support to operate the index, a beveled pinion secured on the lower portion of the spindle, a segmental gear, a stud on the lower portion of the support and on which the gear oscillates in mesh with the pinion, a stop on the support engaging a segmental slot in the gear, a bendable rod secured to the hub portion of the gear, and a float on the end of the rod.

4. A gage comprising a casing having a dial plate, an index therefor and a cover at the outer end, a support extending below the plate and in the casing, a spindle journaled on the support to operate the index, a beveled pinion on the spindle, a segmental gear of sheet metal provided with an upper flanged and toothed end that meshes with the pinion and with a segmental slot between the pivot thereof and the teeth, a stop pin on the support engaging the slot, and a float operatively connected to the gear to oscillate the latter.

5. A gage comprising a casing having a dial plate and cover at the head thereof, a support extending into the casing and below the plate, a spindle journaled in the upper portion of the support to operate the index, a beveled gear on the spindle, a segmental sheet metal gear having a flanged and toothed upper end meshing with the pinion and a hub portion rotatably secured to a stud of the support, a stop limiting the movement of the gear, and a bendable rod connecting a float to the hub portion of the gear.

In testimony whereof I affix my signature in presence of two witnesses.

PHILO M. GELATT.

Witnesses:
C. R. STICKNEY,
ANNA M. DORR.